(12) United States Patent
Marchand

(10) Patent No.: US 11,850,638 B2
(45) Date of Patent: Dec. 26, 2023

(54) APPARATUS AND METHOD FOR CLEANING CONTAINERS

(71) Applicant: Amfomed AG, Allschwil (CH)

(72) Inventor: Claude Marchand, Holstein (CH)

(73) Assignee: AMFOMED AG, Allschwil (CH)

( * ) Notice: Subject to any disclaimer, the term of this patent is extended or adjusted under 35 U.S.C. 154(b) by 0 days.

(21) Appl. No.: 17/208,166

(22) Filed: Mar. 22, 2021

(65) Prior Publication Data

US 2021/0291241 A1    Sep. 23, 2021

(30) Foreign Application Priority Data

Mar. 23, 2020   (DE) .......................... 102020107864.1

(51) Int. Cl.
| | | |
|---|---|---|
| *B08B 9/093* | (2006.01) | |
| *B05B 3/02* | (2006.01) | |
| *B05B 3/06* | (2006.01) | |
| *B08B 5/02* | (2006.01) | |
| *B08B 5/04* | (2006.01) | |
| *B08B 9/087* | (2006.01) | |

(Continued)

(52) U.S. Cl.
CPC ............ *B08B 9/0936* (2013.01); *B01L 13/02* (2019.08); *B05B 3/025* (2013.01); *B05B 3/06* (2013.01); *B08B 5/02* (2013.01); *B08B 5/04* (2013.01); *B08B 9/087* (2013.01); *B08B 9/283* (2013.01); *B08B 9/34* (2013.01); *B08B 9/36* (2013.01); *B08B 2209/08* (2013.01)

(58) Field of Classification Search
CPC .............. B01L 13/02; B01L 2200/141; B01L 2300/0609; B01L 2300/0832; B01L 2400/0487; B01L 2400/049; B05B 3/025; B05B 3/06; B08B 2209/08; B08B 5/02; B08B 5/04; B08B 9/087; B08B 9/0936; B08B 9/283; B08B 9/34; B08B 9/36; B08B 9/0933; B08B 9/28; G01N 2035/0437

See application file for complete search history.

(56) References Cited

U.S. PATENT DOCUMENTS

| | | | |
|---|---|---|---|
| 4,341,568 A | 7/1982 | Christensen | |
| 7,658,198 B2 * | 2/2010 | Brinker | B08B 9/08 15/302 |

(Continued)

FOREIGN PATENT DOCUMENTS

| | | | |
|---|---|---|---|
| CH | 704093 A2 | 5/2012 | |
| JP | S646760 A | 1/1989 | |
| WO | WO-2012062520 A2 * | 5/2012 | ............... B05B 9/08 |

OTHER PUBLICATIONS

Machine translation of WO2012/062520A2 (Year: 2012).*

(Continued)

*Primary Examiner* — Douglas Lee
(74) *Attorney, Agent, or Firm* — Vivacqua Crane, PLLC

(57) ABSTRACT

The invention relates to an apparatus and to a method for cleaning vessels. The vessel cleaning apparatus (10) has a suction lance (20) and a flushing lance (40). The flushing lance (40) is configured to receive fluid, such as cleaning liquid and/or compressed air, and to expel it against an inner wall of a vessel to be cleaned. The suction lance (20) is configured to suck off and lead off fluids present in the vessel as well as cleaning liquid supplied through the flushing lance (40) from the vessel, preferably against the direction of effect of gravity.

19 Claims, 3 Drawing Sheets

Figures 1A, 1B:
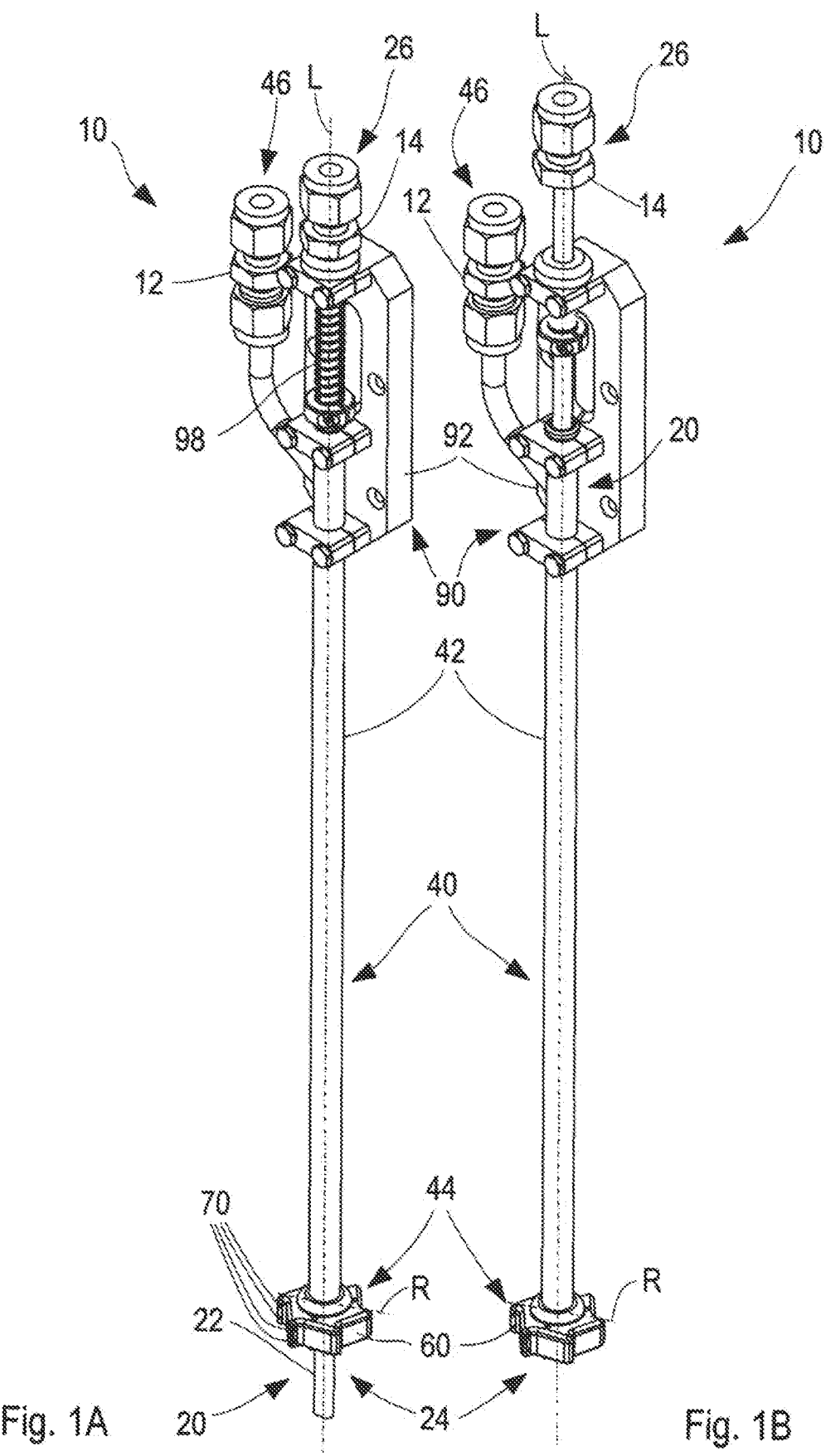

(51) Int. Cl.
*B08B 9/28* (2006.01)
*B08B 9/34* (2006.01)
*B08B 9/36* (2006.01)

(56) References Cited

U.S. PATENT DOCUMENTS

| | | | | |
|---|---|---|---|---|
| 2006/0226257 | A1* | 10/2006 | Lee | B05B 3/0427 |
| | | | | 239/251 |
| 2009/0173362 | A1* | 7/2009 | Bramsen | B08B 9/0936 |
| | | | | 134/57 R |
| 2016/0008859 | A1* | 1/2016 | Høxbroe | B08B 9/0936 |
| | | | | 134/113 |
| 2016/0341431 | A1* | 11/2016 | Topfer | B05B 3/06 |

OTHER PUBLICATIONS

European Patent Office. Extended European Search Report for EP Application No. 21164027.1, dated Sep. 14, 2021, pp. 1-9.
German Patent and Trademark Office. Search Report for Patent Application No. 102020107864.1, dated Feb. 3, 2021.

\* cited by examiner

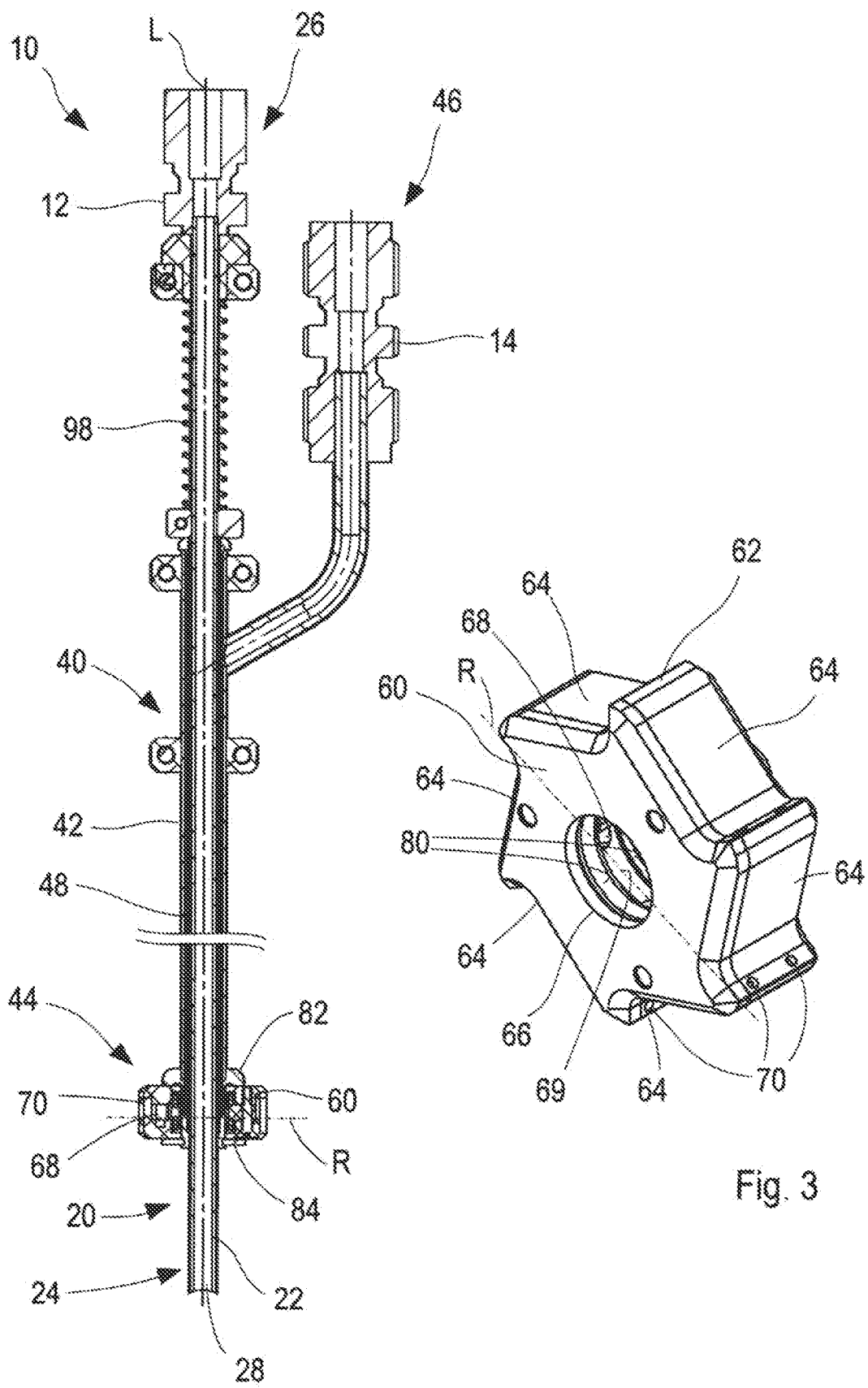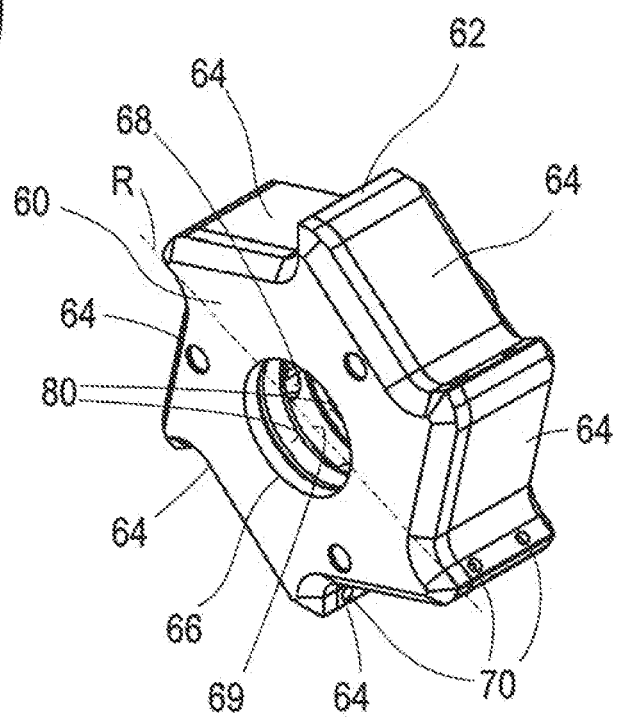

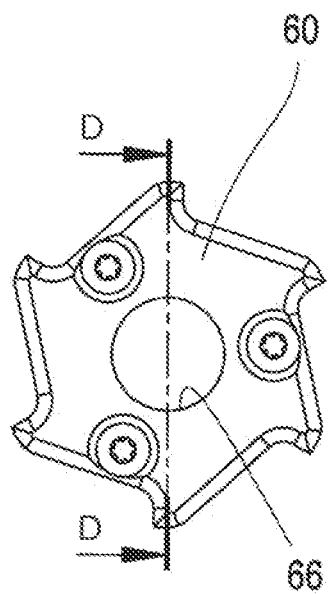 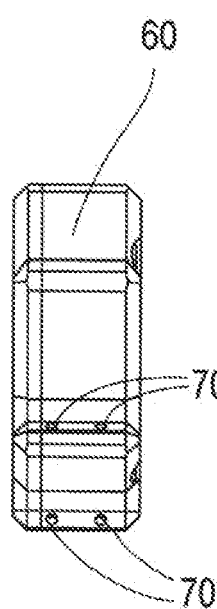 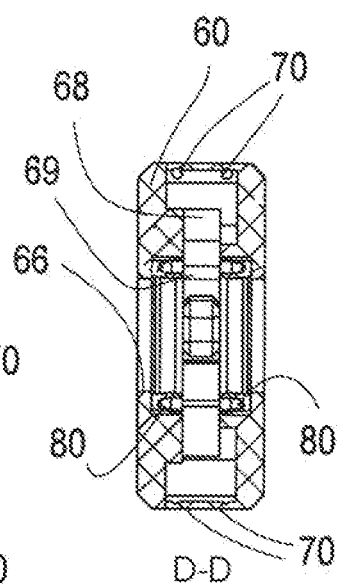
Fig. 4A  Fig. 4B  Fig. 4C
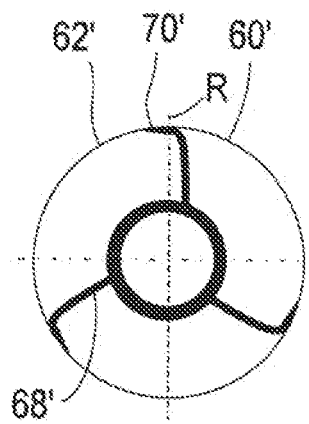 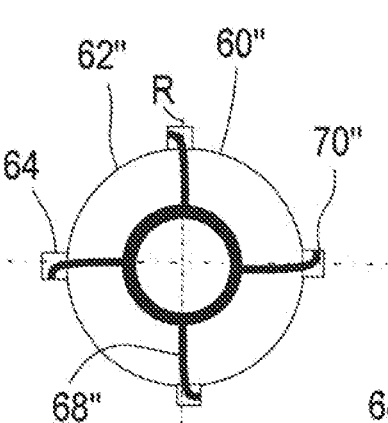 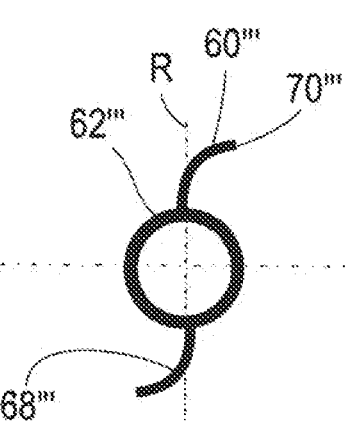
Fig. 5A  Fig. 5B  Fig. 5C

APPARATUS AND METHOD FOR CLEANING CONTAINERS

The present application claims priority to German patent application number DE102020107864.1, filed on Mar. 23, 2020.

The present invention relates to an apparatus and a method for cleaning vessels.

For example, in laboratory operation, different types of vessels, such as bottles, laboratory glassware or test tubes, are filled with various liquids, which may be any desired chemicals, manually or via the most varied apparatus, such as liquid handling apparatus, at chromatographs or other analysis apparatus. Such liquids may, for example, arise as fractions at a chromatograph and are, for example, collected in laboratory glassware in a rack. At some point in the processing of the filled liquids, they are so-called waste that must ultimately be disposed of.

On the one hand, this takes place manually in that the respective laboratory vessel is removed from the rack by the laboratory technician and is emptied into a sink that is usually located beneath a fume cupboard. The laboratory vessel is then placed into a dishwasher and is mechanically cleaned with the opening facing downward. The manual handling of laboratory vessels filled with liquids entails certain risks. The substance present in the laboratory vessel can be released on an accidental emptying or dropping of the laboratory vessel and, depending on its nature, can endanger the health of the laboratory technician or at least pollute the surroundings and can also contaminate adjacent laboratory vessels with liquids that should be preserved.

For large quantities of laboratory vessels to be handled, the manual removal of the laboratory vessels is anyway too time-consuming and thus too costly.

The disposal of liquids present in laboratory vessels can and should also take place in an automated manner. For example, robots are generally suitable for removing laboratory vessels from their racks, emptying them at a suitable location by turning them upside down and feeding them, individually or combined as racks, to a dishwasher upside down with the opening facing downward in order to subject them to a mechanical flushing process.

However, even the automated handling of laboratory vessels via robots is not free of risks. Collisions can, for example, have the result that the contents can exit from laboratory vessels and can cause contamination. Unpredictable events, such as power failures, can also result in situations in which potentially dangerous substances exit in an uncontrolled manner or the laboratory vessels containing the substances can only be gripped again with difficulty because they are possibly in an unfavorable removal position at the robot arm.

Therefore, apparatus and methods are desired that make the handling of vessels safer, in particular of laboratory vessels together with the liquids contained in them and to be disposed of, that are suitable for large accumulating quantities of vessels, and that can furthermore be implemented in an inexpensive manner.

It is the object of the present invention to provide such apparatus and methods.

It is further an object of the present invention to provide apparatus and methods by means of which the flushing of vessels, in particular of laboratory vessels, is possible in a more homogeneous manner than is currently known in the prior art.

These objects are satisfied by a vessel cleaning apparatus in accordance with the claims.

Further advantageous embodiments are set forth in the dependent claims.

In accordance with the invention, a vessel cleaning apparatus, in particular a laboratory vessel cleaning apparatus, is provided with a suction lance and a flushing lance that extend in a longitudinal direction, wherein the suction lance has a suction tube having an open suction end that is connected to a disposal connection end, which is arranged opposite the suction end, via a suction passage formed continuously in the suction tube, wherein the suction lance is configured to suck off fluid from a vessel, in particular from a laboratory vessel, at its suction end, preferably against the direction of effect of gravity, and to lead it off at its disposal connection end, wherein the flushing lance has a flushing tube having a flushing end that is connected to a supply connection end, which is arranged opposite the flushing end, via a flushing passage formed continuously in the flushing tube, wherein the flushing lance is configured to receive fluid, such as cleaning liquid and/or compressed air, at its supply connection end and to expel it at its flushing end.

The suction lance is connectable via its disposal connection end to a disposal system, which has a vacuum applied to it, for chemicals or contaminated waste water. The supply connection end is connectable to a supply system for cleaning liquid that supplies a selected cleaning liquid via a pump, for example.

The apparatus in accordance with the invention makes it possible to dispose of liquids from a vessel, in particular from a laboratory vessel, in its normal position of use, i.e. with the opening located at the top and the liquid collected at the bottom, without having to remove the vessel from a rack, for example. Directly after this, the vessel can be flushed, i.e. washed, with a cleaning liquid via the same apparatus, wherein the cleaning liquid is already sucked off and led off from the vessel during the cleaning process in order to either to dispose of it or process it again. The vessel does not necessarily have to be absolutely perpendicular for this purpose; a certain slanted position is also possible if the cleaning apparatus is accordingly inclined.

In a further development of the apparatus in accordance with the invention, the suction tube is arranged concentrically and spaced apart in the flushing tube. A particularly compact design of the cleaning apparatus thus results, wherein the cleaning liquid runs down at the wall of the cleaned vessel and is sucked off centrally at the bottom of the vessel.

In a further embodiment of the apparatus in accordance with the invention, the flushing lance has a flushing head at the flushing end of the flushing tube, in which flushing head the flushing passage extends as a flushing head passage while changing direction away from the longitudinal direction and leads into a flushing opening, preferably formed as a nozzle, at an outer periphery of the flushing head. The spray head configured in this way makes it possible to deflect the cleaning liquid to the vertical side walls of the vessel in a targeted manner and thus to improve the cleaning effect.

In a further development of the apparatus in accordance with the invention, the flushing head is polygonal, in particular star-shaped, and the flushing opening that is preferably formed as a nozzle is arranged in an outer marginal region radially inwardly of the outer periphery of the polygonal flushing head that is in particular star-shaped. This design of the spray head enables a favorable exit of the flushing jet from the flushing head in the direction of the inner vessel walls, which contributes to a better cleaning effect.

In yet a further embodiment of the apparatus in accordance with the invention, in the flushing head, the flushing passage branches into at least two flushing head passages that lead into an associated flushing opening, preferably twelve flushing openings, at the outer periphery of the flushing head. The additional flushing openings ensure that the cleaning liquid is better distributed over the vertical side walls of the vessel, whereby the cleaning effect is further increased.

In yet a further embodiment of the apparatus in accordance with the invention, a structure, preferably a radial recess, into which the flushing head passage leads, is formed at the outer periphery of the flushing head. This design of the outlet end of the flushing head passage at the outer periphery of the flushing head ensures that the cleaning liquid not only radially impacts the vertical side walls of the vessel, but also with a certain tangential portion, which in turn increases the cleaning effect.

It has proved to be advantageous if, in a further embodiment of the apparatus in accordance with the invention, the flushing head is rotatable, preferably rotatably fastened to the flushing tube. Designing the flushing head as rotatable provides the possibility of further increasing its cleaning effect.

This in particular applies if the flushing head is rotatably driven in a further embodiment.

A particularly favorable variant of the rotatable drive is present when the flushing head passage leads from the flushing head at an angle, preferably at an angle of approximately 90 degrees, to a radial line of the flushing head and the flushing head is set into rotation by a recoil of exiting fluid. The flushing head is then allowed to revolve solely by the exiting fluid without an additional drive being necessary and the cleaning effect is increased accordingly.

In an embodiment variant of the rotatable flushing head, it is rotatably supported at the flushing tube by seals, wherein there is preferably a clearance between the seal and the flushing tube or between the seal and the flushing head. This represents a particularly favorable form of the support of the flushing head at the flushing pipe that, on the one hand, ensures that the flushing head rotates with a small friction resistance on the flushing tube and, and on the other hand, makes a more expensive and/or complex support unnecessary. It is sufficient if the seals are in light contact with the flushing pipe and/or with the flushing head. A certain leaking between the flushing head and the flushing pipe is completely harmless since only cleaning liquid exits here that lubricates and that also assists in the cleaning and, like the fluid exiting from the flushing passage, is ultimately sucked off.

In a variant of the apparatus in accordance with the invention, the fluid expelled by the flushing lance is air so that the vessel cleaning apparatus also serves as a drying apparatus. By changing the supply of the spray lance from cleaning liquid to compressed air, a drying function for the vessel can also be implemented in a simple manner, for instance, subsequently to a cleaning on site, for example on the rack.

In a further development of the apparatus in accordance with the invention, the suction end of the suction tube is non-planar, preferably concave, convex, or chamfered. The design of the end of the suction tube in a non-planar manner ensures that even in the case of a cambered base of the vessel with the flushing lance seated on the base, the suction opening remains free so that the liquid present in the vessel can be reliably sucked off.

In a further further development of the apparatus in accordance with the invention, the suction lance and the flushing lance are displaceable relative to one another in the longitudinal direction and are preloaded away from one another in the longitudinal direction by a preload spring. In this way, it can be ensured that on the introduction of the flushing lance beneath the suction lance into the vessel up to the base of the vessel, the suction lance only gently comes into contact with the base and is not placed on it in a hard manner.

The cleaning apparatus in accordance with the invention can be extended by providing a mechanical cleaning apparatus, such as a brush, in a region of the flushing end of the flushing lance. Stubborn, crystallized deposits at vessel walls can thus also be dissolved and can subsequently be washed off.

In accordance with the invention, an arrangement of one or more vessel cleaning apparatus, in particular laboratory vessel cleaning apparatus, is also provided at a working head of a liquid handling apparatus for a parallel cleaning and/or drying of a plurality of vessels, which are in particular provided in racks, in particular of laboratory vessels. By providing a plurality of liquid handling apparatus at a working head of a liquid handling apparatus, a handling system that is anyway present can also be used to move and to position the vessel cleaning apparatus as required. The suction and flushing performance is considerably increased by the plurality of apparatus used compared to the use of just one apparatus.

In accordance with the invention, provision is also made that an arrangement of one or more vessel cleaning apparatus, in particular laboratory vessel cleaning apparatus, is formed at a specific cleaning station for a parallel cleaning and/or drying of a plurality of vessels, which are in particular provided in racks, in particular of laboratory vessels. In this way, a separate station is provided specifically for the purpose of cleaning and/or drying vessels, in particular laboratory vessels, supplied by separate devices, in particular laboratory devices, and in so doing avoiding the disadvantages of conventional dishwashers that require a removal and a turning over of the respective vessels to be cleaned. The specific cleaning station can be added separately to any desired device and can be manufactured and distributed as a separate system.

In accordance with the present invention, a vessel cleaning method, in particular a laboratory vessel cleaning method, by means of a vessel cleaning apparatus, in particular by means of a laboratory vessel cleaning apparatus, comprising the following steps is also provided:
introducing the suction lance into a vessel to be cleaned, in particular into a laboratory vessel;
if applicable, sucking off liquids present in the vessel from the vessel via the suction lance, preferably against the effect of gravity;
introducing the flushing lance into the vessel to be cleaned at the same time as or subsequently to the introduction of the suction lance;
supplying a cleaning liquid through the flushing lance so that it is at least expelled toward vertical inner walls of the vessel; and simultaneously vertically moving at least the flushing lance within the vessel and sucking off the cleaning liquid collecting at the bottom of the vessel via the suction lance, preferably against the effect of gravity.

This cleaning method replaces the previous procedures to manually or mechanically remove vessels filled with liquids, in particular laboratory vessels, from the corresponding device, in particular a laboratory device, to take them to a disposal station, to turn them over and empty them there, and then to move them further into a dishwasher, and finally to clean them there. The present method allows the emptying and cleaning of vessels, in particular laboratory vessels, in the region of the device, in particular of the laboratory device, in which they were filled at one and the same place in two successive worksteps without having to touch a vessel at all or even having to turn it over. The procedure in accordance with the invention is thus safe, in particular for laboratory technicians, less prone to error, and extremely economical.

In an embodiment of the method in accordance with the invention, the additional step of rotating the flushing head of the flushing lance within the vessel relative to the vessel is performed, whereby the cleaning performance is improved.

In an embodiment of the method in accordance with the invention, the following steps are additionally performed: repeatedly vertically raising and lowering at least the flushing lance within the vessel up to the reaching of a desired degree of purity of the vessel. Depending on the degree of purity of the vessel desired by the customer or user and depending on the liquid initially present in the vessel, it can be determined how often the flushing lance is raised and lowered in this vessel in the flushing operation and the arising contaminated cleaning liquid is sucked off accordingly. Tests have shown that three flushing cycles are already sufficient to achieve a high cleaning quality that meets demanding requirements.

It has proved to be advantageous if a vessel drying method, in particular a laboratory vessel drying method, comprising the following steps is also performed by means of the vessel cleaning apparatus in accordance with the invention: introducing the flushing lance and the suction lance into a vessel to be dried, in particular into a laboratory vessel, or leaving the flushing lance and the suction lance in a vessel that has just been cleaned, in particular in a laboratory vessel; supplying air through the flushing lance so that the air is at least expelled toward vertical inner walls of the vessel; and simultaneously, optionally repeatedly, vertically raising and lowering at least the flushing lance within the vessel and optionally sucking off liquid possibly present at the bottom of the vessel via the suction lance, preferably against the effect of gravity.

It is thus, for example, possible to additionally perform a drying of the vessel at the location at which the cleaning of the vessel was carried out since the evaporation of cleaning liquid residues is accelerated by the compressed air supplied by the flushing lance and the vessel can accordingly be refilled faster.

With respect to the materials used for the flushing lance and the suction lance, it can be stated that the skilled person will choose them in accordance with the substances present in the vessel that are to be disposed of in order to avoid a corrosion or decomposition or other chemical reaction of the materials used with the respective substances. Suitable materials can, for example, be stainless steel, but also various plastics such as PEEK. The suction tube and the flushing tube are preferably not too strong so that they may yield slightly on contact with the vessel to be cleaned so that neither the vessel cleaning apparatus nor the vessel is damaged.

The cleaning liquid used is selected such that, on the one hand, a good cleaning effect is achieved and, on the other hand, an unwanted reaction with substances remaining in the vessel is avoided. Alcohol, acetone, or possibly also just distilled water can, for example, come into question as a cleaning liquid.

The connection of the supply connection end to a hose of the supply system for cleaning liquid and the connection of the disposal connection end to a hose of the disposal system can take place via conventional screw connections used in operation, in particular in laboratory operation, or the like.

The holding of the vessel cleaning apparatus at an associated working head, for example of a liquid handling apparatus, can take place in any desired manner, preferably using the mount anyway provided at the working head.

The invention will be described by way of example in the following with reference to the drawings in which there are shown:

FIG. 1A a three-dimensional representation of a vessel cleaning apparatus in accordance with the invention, designed as a laboratory vessel cleaning apparatus, in a state with the suction tube extended;

FIG. 1B a three-dimensional representation of the laboratory vessel cleaning apparatus of FIG. 1A in a state with the suction tube retracted;

FIG. 2 a longitudinal sectional view of the laboratory vessel cleaning apparatus of FIG. 1A;

FIG. 3 a three-dimensional representation of a flushing head of the laboratory vessel cleaning apparatus of FIG. 1A;

FIG. 4A a plan view of the flushing head of the laboratory vessel cleaning apparatus of FIG. 1A;

FIG. 4B a side view of the flushing head of the laboratory vessel cleaning apparatus of FIG. 1A;

FIG. 4C a sectional view of the flushing head of the laboratory vessel cleaning apparatus of FIG. 1 along the line D-D of FIG. 4A; and FIGS. 5A, 5B, 5C schematic representations of alternative flushing heads in accordance with the present invention.

FIGS. 1A and 1B each show a three-dimensional representation of a laboratory vessel cleaning apparatus 10 as a preferred embodiment of a vessel cleaning apparatus in accordance with the invention in different operating positions. As is shown in FIG. 1A, the laboratory vessel cleaning apparatus 10 has a suction lance and a flushing lance 40. The suction lance 20 has a suction tube 22 having an open suction end 24 and a disposal connection end 26 which is arranged opposite the suction end 24 and at which a screw connection 14 is provided for connection to a hose, not shown, that leads to a disposal system, not shown. The flushing lance 40 has a flushing tube 42 having a flushing end 44 and a supply connection end 46 which is arranged opposite the flushing end 44 and at which a screw connection 12 is provided for connection to a hose, not shown, that comes from a cleaning liquid supply system, not shown, or alternatively from a compressed air source. A flushing head 60 is rotatably fastened around the flushing tube 42 at the flushing end 44 of the flushing lance 40. The suction tube 22 is arranged concentrically and spaced apart in the flushing tube 42.

The suction lance 20 is configured to suck off fluid from a laboratory vessel, not shown, at its suction end 24, preferably against the direction of effect of gravity, and to lead it off at its disposal connection end 26 to the disposal system.

A suction passage 28 (shown in FIG. 2), which opens outwardly at the suction end 24, extends from the disposal connection end 26 through the suction tube 22 in the longitudinal direction.

The flushing lance 40 is configured to receive fluid, such as cleaning liquid and/or compressed air, at its supply connection end 46 and to expel it at its flushing openings 70 at approximately 90 degrees to the longitudinal direction L and at approximately 90 degrees to the radius direction R, that is in an approximately tangential direction to the inner wall of the laboratory vessel to be cleaned, not shown. Other angles to the longitudinal direction L and to the radius direction R are possible and are within the scope of the present invention.

The recoil effect of the expelled cleaning liquid or of the expelled compressed air sets the flushing head 60 into rotation relative to the flushing tube 42 in a rotational direction opposite the direction in which the flushing tube passage leads outwardly. In the present embodiment, this is the clockwise direction, viewed from above. The other direction of rotation can likewise be implemented with a corresponding design of the flushing head 60.

In the region of the disposal connection end 26 or of the supply connection end 46, a holder 90 is provided for mounting the laboratory vessel cleaning apparatus 10 at any desired working head of a laboratory device, for example of a liquid handling device of a chromatograph, or at a robot arm so that the laboratory vessel cleaning apparatus is the end effector. The manner of the fastening of the laboratory vessel cleaning apparatus 10 is selected in accordance with the device holding the cleaning apparatus. The holder illustrated is therefore purely exemplary and any other suitable design of the holder may also be selected for fastening the laboratory vessel cleaning apparatus 10 to the corresponding device.

In the embodiment shown, the holder comprises a flange 92 to which the flushing lance 40 is rotationally fixedly screwed and to which the suction lance 20 is screwed such that it is displaceable over a certain range at least in its longitudinal direction. A preload spring 98 preloads the suction lance 20 into an extended position.

In FIG. 1B, the laboratory vessel cleaning apparatus 10 of FIG. 1A is shown in the position with the suction lance 20 retracted against the preload of the preload spring 98.

FIG. 2 shows the laboratory vessel cleaning apparatus 10 of FIG. 1A in a longitudinal section without a screwed flange 92. In the suction tube 22 of the suction lance 20, a suction passage 28 is formed that extends in the longitudinal direction L, that establishes a connection between the connector 12 at the disposal connection end 26 and the suction end 24 of the suction tube 22, and that leads outwardly there. The suction end 24 of the suction tube 22 is concave such that it cannot, preferably nowhere, be seated at the base of a laboratory vessel with its full periphery and so that it can thus prevent the sucking off or pumping off of the liquid present therein.

A flushing passage 48 extends in the longitudinal direction L in the intermediate space between the suction tube 22 and the flushing tube 42 and branches into a plurality of individual flushing passages 68 in a transition region between the flushing tube 42 and the flushing head 60. The flushing passage 48 in so doing penetrates the wall of the flushing tube 42 at the flushing end 44. The flushing head passages 68 further extend through the flushing head 60, while changing direction by approximately 90 degrees away from the longitudinal direction L and by approximately 90 degrees away from a radius line R extending perpendicular to the longitudinal direction, and each lead into a flushing opening 70 at an associated structure that is formed as a recess 64 in the present embodiment. The recesses 64 are arranged at equal spacings around the outer periphery 62 of the flushing head 60. Two rows of flushing openings 70 and associated flushing head passages 68 are provided above one another in the longitudinal direction L. The flushing passage 48 and the flushing head passages 68 establish a connection between the connector 14 at the supply connection end 46 and the space outside the flushing openings 70.

The supply connector 14 is formed laterally at the supply connector end 46 so that the connector 14 of the flushing lance 20 and the connector 12 of the suction lance are freely accessible.

The design of the connectors 12, 14 at the suction lance 20 and at the flushing lance 40 is not limited to the embodiment shown, but can rather be redesigned as required depending on the supply system or disposal system used.

The flushing head 60 is rotatably supported at the flushing tube 40 by two seals 80 (shown as better visible in FIG. 3) that are in light contact. The fastening of the flushing head 60 to the flushing tube 40 takes place by a holding ring 82, which is fastened to or formed at the flushing tube 42, at the side of the flushing head 60 in the direction of the supply connection end and takes place via a circlip 84 at the side of the flushing head 60 in the direction of the flushing end 44. In this respect, so much clearance is provided that the flushing head 60 can rotate freely around the flushing tube 42. The fastening is exemplary and can also take place in another manner, for example by two circlips.

FIG. 3 shows the flushing head 60 in more detail in a three-dimensional representation. The outer periphery 62 of the flushing head is bounded by an imaginary cylinder that is provided with six recesses 64. In the plan view, the flushing head therefore has a polygonal, star-like shape. In the recesses 64, two respective flushing passages 68 disposed above one another lead into the open air at flushing openings 70 at the outer marginal region of one flank of the polygon. A total of twelve flushing openings 70 are therefore provided in the present embodiment. The number of recesses and the number of flushing openings 70, the latter also in a vertical direction, may be lower or may also be higher. In the vertical direction, it is sufficient that only one row of flushing openings is provided. The distribution of the recesses and flushing openings can just as well be irregular. For example, the flushing openings can be displaced from one another in the vertical direction. In the embodiment shown, the flushing openings expel the cleaning liquid approximately in parallel with a tangent to the vessel wall of the laboratory vessel to be cleaned if a vessel having a cylindrical inner wall is assumed. Furthermore, the flushing openings 70 themselves can be provided with different shapes. As in the present embodiment, they can, for example, be tapered outwardly so that they form nozzles (cf. FIG. 4C). However, they can also be widened outwardly. They can likewise be provided with guide devices that, for example, bring about a swirl of the exiting cleaning liquid jet. Separate nozzle elements can also be inserted into the flushing openings and/or the outlet openings can be coated with wear-reducing coatings.

A bore 66, through which the flushing tube 42 is introduced on the assembly, is provided through the center of the flushing head 60. A circular ring-shaped distribution ring recess 69 is present in the interior of the flushing head 60. Via this distribution ring recess 69, the cleaning liquid supplied via the flushing pipe 42 is distributed over the individual outwardly leading flushing head passages 68. Annular seals 80 are located at both sides of the recess. These seals 80 contact the flushing tube 42 relatively loosely in the assembled state of the flushing head 60 to ensure that the flushing head 60 can rotate with little resistance. In this respect, some of the cleaning liquid may by all means pass between the flushing head 60 and the seals 80 since, on the one hand, it serves as a lubricant and, on the other hand, it is also hurled in the direction of the laboratory vessel migrations and fulfills a cleaning function after the passing through between the flushing head 60 and the seals 80.

FIG. 4A shows a plan view of the flushing head 60. Three screw heads are shown that belong to screws that connect two half-shells to one another from which the flushing head 60 is assembled. However, it is within the scope of the invention to produce the flushing head 60 in another manner. For example, half-shells could be adhesively bonded to one another. A single-piece manufacture of the flushing head 60 is also conceivable. Additive manufacturing processes, such as 3-D printing, can also be considered.

FIG. 4B is a side view of the flushing head 60 of FIG. 4A.

FIG. 4C is a side view of the flushing head 60 of FIG. 4A along the line D-D of FIG. 4A. In this view, the two seals 80 as well as the flushing head passages 68 with the distribution ring recess 69 and the conically tapered, nozzle-like flushing openings 70, into which the flushing head passages 68 lead, are better visible.

FIG. 5A purely schematically shows a plan view of an alternative flushing head 60' in accordance with the invention with indicated flushing head passages 68'. No recesses are provided at the outer periphery 62' of the flushing head 60', but the flushing head passages 68' likewise lead at an angle to a radius line R approximately in parallel with a tangent to the inner wall of the laboratory vessel to be flushed.

FIG. 5B purely schematically shows a plan view of an alternative flushing head 60" in accordance with the invention. Outwardly directed projections are provided as structures at the outer periphery 62" of the flushing head 60". However, the flushing head passages 68" likewise lead at an angle to a radius line R approximately in parallel with a tangent to the inner wall of the laboratory vessel to be flushed.

FIG. 5C purely schematically shows a plan view of an alternative flushing head 60'" in accordance with the invention. The flushing head passages 68'" are connected as angled tubular pieces, for example inserted into bores present in the flushing head 60'", to the outer periphery 62'" of the flushing head 60'" that here has a smaller diameter than in the other embodiments.

The dimensioning of laboratory vessel cleaning apparatus in accordance with the invention takes place in accordance with the laboratory vessels to be cleaned. In principle, practically any length and any flushing head diameter are conceivable. For conventional laboratory glassware in which, for example, waste from laboratory devices is collected, the length of the cleaning apparatus can amount to 300 mm and the flushing head diameter can amount to approximately 30 mm. If the cleaning of test tubes is sought after, the dimensions can be reduced accordingly.

The cleaning performance of the apparatus in accordance with the invention primarily depends on the number of flushing passages, on the expelled volume of cleaning liquid, and on the expulsion speed of the cleaning liquid. Examples of suitable cleaning liquids are acetone and alcohol.

If the substances present in the laboratory vessels to be cleaned tend to crystallize at the walls of the laboratory vessel, it is conceivable to additionally fasten brushes or sponge structures to the flushing head that have a mechanical effect on the deposited contaminants at the vessel walls due to their rotation with the flushing head.

A cleaning method using the laboratory vessel cleaning apparatus 10 in accordance with the invention takes place using the following steps: the suction lance 20 and the flushing lance 40 are first introduced into a laboratory vessel to be cleaned. Any liquids present in the laboratory vessel are sucked off from the laboratory vessel via the suction lance 20 against the effect of gravity, that is upwardly. A cleaning liquid is supplied under pressure through the flushing lance 40 so that it is expelled toward the inner walls of the laboratory vessel, wherein the flushing head 60 rotates within the laboratory vessel relative to the laboratory vessel and to the flushing tube 42 due to the recoil effect of the exiting cleaning liquid. At the same time, at least the flushing lance 40 is moved upwardly and downwardly within the laboratory vessel and the cleaning liquid collecting at the bottom of the laboratory vessel is sucked off upwardly via the suction lance 20 against the effect of gravity. This process is repeated multiple times, if necessary, until the sought after degree of purity of the laboratory vessel has been achieved.

Additionally or alternatively, a laboratory vessel drying method can also be performed by means of the same laboratory vessel cleaning apparatus 10. In this respect, the flushing lance 40 and the suction lance 20 are introduced into a laboratory vessel to be dried or, if they are already present therein, are left in it. Compressed air is thereupon supplied through the flushing lance 40 so that it is expelled toward the vertical inner walls of the laboratory vessel. At the same time, at least the flushing lance 40 is vertically raised and lowered within the laboratory vessel, wherein this may also be performed multiple times. If necessary, liquid present at the bottom of the laboratory vessel is also sucked off via the suction lance 20 against the effect of gravity.

REFERENCE NUMERAL LIST 10 laboratory vessel cleaning apparatus
12 connector at disposal connection end
14 connector at supply connection end
20 suction lance
22 suction tube
24 suction end
26 disposal connection end
28 suction passage
40 flushing lance
42 flushing tube
44 flushing end
46 supply connection end
48 flushing passage
60, 60', 60'" flushing head
62, 62', 62'" flushing head outer periphery
64 structure
66 bore
68, 68', 68", 68'" flushing head passage
69 distribution ring recess
70, 70', 70", 70'" flushing opening
80 seal
82 holding ring
84 circlip
90 holder
92 flange
98 preload spring
L longitudinal direction
R radius line

The invention claimed is:

1. A laboratory vessel cleaning apparatus, comprising a suction lance and a flushing lance that extend in a longitudinal direction, wherein the suction lance has a suction tube having an open suction end that is connected to a disposal connection end, the disposal connection end being arranged opposite the suction end, the open suction end being connected to the disposal connection end via a suction passage formed continuously in the suction tube, wherein the suction lance is configured to suck off a fluid from a vessel and to lead the fluid off at the disposal connection end of the suction lance, wherein the flushing lance has a flushing tube having a flushing end that is connected to a supply connection end, the supply connection end being arranged opposite the flushing end, the flushing end being connected to the supply connection end via a flushing passage formed continuously in the flushing tube, wherein the flushing lance is configured to receive the fluid at the supply connection end of the flushing lance and to expel the fluid at the flushing end of the flushing lance, wherein in a region of the disposal connection end or of the supply connection end, a holder is provided for mounting the laboratory vessel cleaning apparatus at a liquid handling device of a chromatograph or at a robot arm so that the laboratory vessel cleaning apparatus is an end effector, wherein the holder comprises a flange to which the flushing lance is rotationally fixedly screwed and to which the suction lance is screwed such that it is displaceable in its longitudinal direction, wherein the flushing lance is displaceable relative to the suction lance in the longitudinal direction, and wherein the suction lance and the flushing lance are preloaded away from one another in the longitudinal direction by a preload spring, wherein the preload spring is arranged at the disposal connection end of the suction lance, wherein the preload spring is arranged surrounding the suction lance, and wherein the preload spring is arranged between a screw connection of the flushing lance to the holder and a screw connection of the suction lance to the holder.

2. The apparatus in accordance with claim 1, wherein the suction tube is arranged concentrically and spaced apart in the flushing tube.

3. The apparatus in accordance with claim 1, wherein the flushing lance has a flushing head at the flushing end of the flushing tube, in which the flushing passage extends as a flushing head passage while changing direction away from the longitudinal direction and leads to a flushing opening at an outer periphery of the flushing head.

4. The apparatus in accordance with claim 3, wherein the flushing head is polygonal and the flushing opening is arranged in an outer marginal region radially inwardly of the outer periphery of the flushing head.

5. The apparatus in accordance with claim 4, wherein the flushing head is star-shaped.

6. The apparatus in accordance with claim 3, wherein, in the flushing head, the flushing passage branches into at least two flushing head passages that each lead to an associated flushing opening at the outer periphery of the flushing head.

7. The apparatus in accordance with claim 6, wherein the at least two flushing head passages each lead to twelve flushing openings at the outer periphery of the flushing head.

8. The apparatus in accordance with claim 3, wherein a structure, into which the flushing head passage leads, is formed at the outer periphery of the flushing head.

9. The apparatus in accordance with claim 8, wherein the flushing head is rotatably supported at the flushing tube by seals.

10. The apparatus in accordance with claim 3, wherein the flushing head is rotatable.

11. The apparatus in accordance with claim 10, wherein the flushing head is rotatably driven.

12. The apparatus in accordance with claim 11, wherein the flushing head passage leads from the flushing head at an angle to a radial line of the flushing head and the flushing head is set into rotation by a recoil of exiting fluid.

13. The apparatus in accordance with claim 10, wherein the flushing head is rotatably fastened to the flushing tube.

14. The apparatus in accordance with claim 3, wherein the flushing opening is formed as a nozzle.

15. The apparatus in accordance with claim 1, wherein the fluid expelled by the flushing lance is air so that the vessel cleaning apparatus also serves as a drying apparatus.

16. The apparatus in accordance with claim 1, wherein the suction end of the suction tube is non-planar.

17. The apparatus in accordance with claim 1, wherein a mechanical cleaning apparatus is provided in a region of the flushing end.

18. The apparatus in accordance with claim 1, wherein the suction lance is configured to suck off the fluid from a vessel at the suction end of the suction lance against a direction of effect of gravity and to lead the fluid off at the disposal connection end of the suction lance.

19. The apparatus in accordance with claim 1, wherein the fluid is at least one of cleaning liquid and compressed air.

* * * * *